United States Patent
Tsukamoto et al.

(10) Patent No.: US 6,716,554 B2
(45) Date of Patent: Apr. 6, 2004

(54) BATTERY CASE, COVER, AND FEEDTHROUGH

(75) Inventors: Hisashi Tsukamoto, Saugus, CA (US); Naoki Ota, Stevenson Ranch, CA (US); Hiroshi Nakahara, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 0 days.

(21) Appl. No.: 10/256,122

(22) Filed: Sep. 26, 2002

(65) Prior Publication Data

US 2003/0027038 A1 Feb. 6, 2003

Related U.S. Application Data

(60) Continuation-in-part of application No. 09/421,171, filed on Oct. 19, 1999, now Pat. No. 6,554,178, which is a division of application No. 09/290,012, filed on Apr. 8, 1999, now abandoned.

(51) Int. Cl.$^7$ .............................. H01M 2/02; H01M 6/00
(52) U.S. Cl. ...................... 429/181; 429/177; 29/623.4; 29/623.1
(58) Field of Search ................................ 429/181, 176, 429/175; 29/623.4, 623.1; 228/122.1, 124.6

(56) References Cited

U.S. PATENT DOCUMENTS

| 3,443,306 A | 5/1969 | Meyer |
| 3,600,017 A | 8/1971 | Scherer |
| 3,646,405 A | 2/1972 | Wallis et al. |
| 3,733,686 A | 5/1973 | Maucher |
| 4,213,558 A | 7/1980 | Hirobe et al. |
| 4,352,714 A | 10/1982 | Patterson et al. |
| 4,372,038 A | 2/1983 | Goebel |

(List continued on next page.)

FOREIGN PATENT DOCUMENTS

| JP | 60203377 A2 | 10/1985 |
| JP | 60203378 A2 | 10/1985 |
| JP | 61088984 A2 | 5/1986 |
| JP | 02022831 A2 | 1/1990 |
| JP | 04055066 A2 | 2/1992 |
| JP | 04081288 A2 | 3/1992 |
| JP | 06234083 A2 | 8/1994 |

(List continued on next page.)

OTHER PUBLICATIONS

US Provisional patent application Ser. No. 60/126,514, dated Mar. 26, 1999 to Malmgren et al.
US Provisional patent application Ser. No. 60/126,531, dated Mar. 26, 1999 to Schulman et al.
Written Opinion, dated Mar. 25, 2002, received in relation to Application No. PCT/US01/20598.
International Preliminary Examination Report, dated Aug. 06, 2002, received in relation to Application No. PCT/US01/20598.

Primary Examiner—M. Alexandra Elve
Assistant Examiner—Len Tran
(74) Attorney, Agent, or Firm—M. Elizabeth Bush

(57) ABSTRACT

A method and apparatus for providing a hermetically sealed electrical feedthrough for use with a metal battery case. The apparatus includes a ceramic-metal feedthrough subassembly, a metal case of low melt point material, and a clad metal case cover comprising a first layer of high melt point material and a second layer of low melt point material. The first layer is hermetically sealed to the case and the second layer is hermetically sealed to a collar on the feedthrough subassembly. In another embodiment, the case body, clad cover, and feedthrough pin are made of metals that can withstand the temperatures required for hermetically sealing the ceramic cylinder directly to the cover. The cover comprises a first material suitable for installing the feedthrough subassembly and a second material matched to the case body for forming a reliable weld thereto.

55 Claims, 6 Drawing Sheets

U.S. PATENT DOCUMENTS

| | | |
|---|---|---|
| 4,479,168 A | 10/1984 | Green, Jr. |
| 4,532,489 A | 7/1985 | Phillips |
| 4,538,212 A | 8/1985 | Montgomery |
| 4,690,480 A | 9/1987 | Snow et al. |
| 4,831,708 A | 5/1989 | Yoshiwara et al. |
| 4,966,748 A | 10/1990 | Miyasaka et al. |
| 4,992,345 A * | 2/1991 | Meintjes et al. ............ 429/103 |
| 5,001,299 A | 3/1991 | Hingorany |
| 5,041,019 A | 8/1991 | Sharp et al. |
| 5,109,594 A | 5/1992 | Sharp et al. |
| 5,110,307 A | 5/1992 | Rapoza |
| 5,250,845 A | 10/1993 | Runyan |
| 5,298,683 A | 3/1994 | Taylor |
| 5,397,661 A | 3/1995 | Kaun |
| 5,405,272 A | 4/1995 | Rapoza |
| 5,433,260 A | 7/1995 | Taylor |
| 5,500,026 A | 3/1996 | Heller et al. |
| 5,506,071 A * | 4/1996 | Tanaka et al. .............. 429/181 |
| 5,535,097 A | 7/1996 | Ruben et al. |
| 5,675,122 A | 10/1997 | Taylor |
| 5,701,758 A | 12/1997 | Haramoto et al. |
| 5,811,206 A | 9/1998 | Sunderland et al. |
| 6,071,557 A | 6/2000 | Haraguchi et al. |
| 6,090,503 A | 7/2000 | Taylor et al. |
| 6,127,064 A | 10/2000 | Shibata et al. |
| 6,132,900 A | 10/2000 | Yoshizawa et al. |
| 6,506,514 B1 | 1/2003 | Endo et al. |
| 6,554,178 B1 * | 4/2003 | Tsukamoto .............. 228/122.1 |
| 6,635,382 B2 * | 10/2003 | Moriwaki et al. .......... 429/176 |
| 2002/0192559 A1 | 12/2002 | Yoshimura et al. |

FOREIGN PATENT DOCUMENTS

| | | |
|---|---|---|
| JP | 06234084 A2 | 8/1994 |
| JP | 07-124755 A2 | 5/1995 |
| JP | 08141754 A2 | 6/1996 |
| JP | 08187581 A2 | 7/1996 |
| JP | 08-332540 A2 | 12/1996 |
| JP | 0 522 687 B1 | 3/1997 |
| JP | 09076076 A2 | 3/1997 |
| JP | 09-155561 A2 | 6/1997 |
| JP | 09-174243 A2 | 7/1997 |
| JP | 10080774 A2 | 3/1998 |
| JP | 10-208777 A2 | 8/1998 |
| JP | 10225778 A2 | 8/1998 |
| JP | 11005162 A1 | 1/1999 |
| JP | 11179566 A2 | 7/1999 |
| WO | WO 00/24542 A1 | 5/2000 |
| WO | WO 02/03483 A1 | 1/2002 |

* cited by examiner

BATTERY CASE, COVER, AND FEEDTHROUGH

CROSS-REFERENCE TO RELATED APPLICATIONS

This application is a Continuation-in-Part of U.S. application Ser. No. 09/421,171 filed on Oct. 19, 1999, now U.S. Pat. No. 6,554,178 which is a Divisional of U.S. application Ser. No. 09/290,012 filed on Apr. 8, 1999, now abandoned.

STATEMENT REGARDING FEDERALLY SPONSORED RESEARCH OR DEVELOPMENT

Not Applicable

REFERENCE TO A "SEQUENCE LISTING"

Not Applicable

BACKGROUND OF THE INVENTION

1. Technical Field

This invention relates to a battery case, cover, and feedthrough and more particularly to a method and apparatus for providing a sealed battery having a lightweight case.

2. Background Art

Battery cases typically require a conductive pin that feeds into the case through a dielectric material that insulates the pin from the conductive case wall. It is generally critical that the feedthrough be hermetically sealed.

Techniques are known for forming a hermetic seal between a metal pin of high melt point material and a ceramic cylinder surrounding the pin. Moreover, an annular metal collar of high melt point material can be hermetically sealed around the ceramic cylinder.

It is often desirable to be able to form a battery case of lightweight low cost material, such as aluminum. Aluminum can be deep drawn and has a density of 2.7 g/cm$^3$ as compared with the density of stainless steel of 7.8 g/cm$^3$. Unfortunately, aluminum melts at a temperature lower than the temperatures normally required to fabricate and install the aforedescribed ceramic-metal feedthrough structure in the case. For example, the fabrication of the aforedescribed structure typically requires the application of a temperature of about 800° C. or more to form a hermetic seal between two high melt point metals and/or between a high melt point metal and a ceramic cylinder. Such an elevated temperature could destroy a case formed of aluminum, which melts just above 600° C.

BRIEF SUMMARY OF THE INVENTION

The present invention is directed to an improved case/feedthrough construction enabling the use of a low melt point case material, e.g., aluminum, in conjunction with a ceramic-metal feedthrough subassembly that requires the application of a high temperature to form a hermetic seal.

In accordance with the invention, a case cover comprising a layer of high melt point material and a layer of low melt point material is used to respectively seal to a high melt point collar on the feedthrough subassembly and a low melt point case.

More particularly, in accordance with a preferred embodiment, a case cover is formed of clad metal comprised of a layer of high melt point material, e.g., stainless steel or titanium, and a layer of low melt point material, e.g., aluminum. A feedthrough hole is formed through the cover. The feedthrough subassembly annular collar is aligned with the hole and hermetically sealed to the clad metal high melt point layer using a high temperature welding process.

The clad metal low melt point layer, e.g., aluminum, can be laser welded to the aluminum case at a lower temperature to form a hermetic seal.

In another embodiment, the feedthrough does not have an annular metal collar, and both layers of cladding can withstand the temperatures required for sealing the dielectric material, e.g. glass, to the cover.

DETAILED DESCRIPTION OF THE INVENTION

The following text describes the preferred mode presently contemplated for carrying out the invention and is not intended to describe all possible modifications and variations consistent with the spirit and purpose of the invention. The scope of the invention should be determined with reference to the claims.

Figure 1:
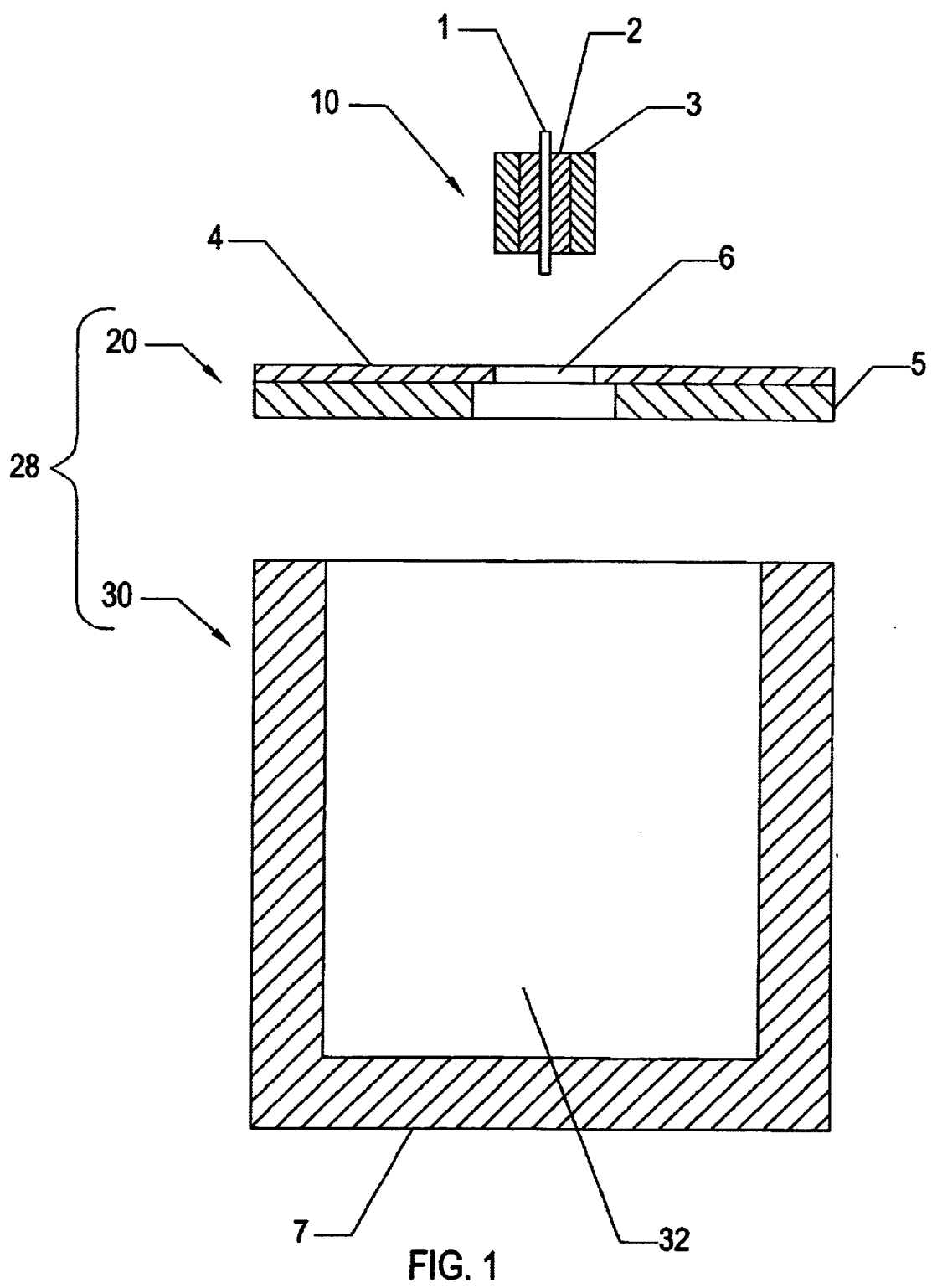
FIG. 1 is an exploded sectional view of a feedthrough subassembly, a battery case, and a case cover in accordance with the invention formed of clad metal.

FIG. 1 depicts a feedthrough subassembly 10 comprising a feedthrough metal pin 1 penetrating a cylindrical ceramic glass core 2. A hermetic seal can be formed between the ceramic and metal by proper application of processes and materials.

Ceramic to stainless and ceramic to titanium are particular examples of materials that can be bonded to form hermetic seals. Braze bonding, for example, aluminum oxide and zirconium oxide ceramic to metals, including titanium, stainless steel, molybdenum, tantalum, and cobalt-chromium alloys, can be done using a braze, comprising 30% nickel and 70% titanium (U.S. Provisional Patent Application Serial No. 60/126,531; PCT Application WO00/56677). Another example of a braze bond includes the preferred method for joining zirconium oxide containing 3% yttrium to preferably a metal alloy, namely, titanium and niobium (55% Ti and 45% Nb), using the nickel-titanium braze (50% Ni and 50% Ti) (U.S. Provisional Patent Application Serial No. 60/126,514; PCT Application WO00/56395).

Other ceramics, such as CaBAl 12 glass, can be hermetically bonded to high melting temperature metals, such as PtIr or Ti-6Al-4V, by a baking process without the addition of a brazing material, as is well known in the art.

Thus, by selecting a pin 1 of stainless steel or titanium or one of the other aforementioned metals and a ceramic core 2 of aluminum oxide, zirconium oxide, CaBAl 12 glass, or other suitable ceramic, the pin 1 and core 2 can be hermetically bonded utilizing a high temperature brazing or baking process. Similarly, an annular collar 3 of stainless steel or titanium or one of the other aforementioned metals can be hermetically sealed around the core 2.

The feedthrough subassembly 10 is used in combination with a battery case 28 comprising a case body 30 defining an interior cavity 32 and a case cover 20 for sealing the cavity. The subassembly 10 is mounted in the cover 20 for providing an electrical connection into and out of the cavity 32. In accordance with the invention, the case cover 20 is formed of clad metal comprising a first layer 4 of a high melt point material, e.g., stainless steel or titanium, and a second layer 5 of a low melt point material, e.g., aluminum.

There are different methods for forming clad metal, such as a plate of stainless steel clad with aluminum. In one method (U.S. Pat. No. 4,213,558, Hirobe, et al.), sheet metal cladding is fed onto one or both faces of the hot solidified continuous cast strip being withdrawn from the casting means and the assembly is then passed to a hot roll bonding system for cladding. Another method (U.S. Pat. No. 4,966,748, Miyasaka et al.) produces a clad metal by forming a layer of the dissimilar metal powder on the surface of a base metal by cold fixing the powder to the surface under pressure, denting only the surface and a subsurface area of the layer of the dissimilar metal powder by melting and immediately solidifying in a vacuum, compressing the layer of the dissimilar metal powder together with the base metal at a temperature not higher than the solidus-line temperature of the two dissimilar metals under a pressure of not lower than 300 kgf/cm$^2$ using a hot isostatic press, and hot working the layer of the dissimilar metal powder together with the base metal. Explosion bonding is a method suited to cladding thick layers of metal such as might be used in 100-Ah cells. Roll cladding is preferred for making case covers up to 3 mm thick.

The case cover 20 defines a feedthrough mounting hole 6 of smaller diameter through layer 4 and larger diameter through layer 5. The feedthrough subassembly 10 is aligned with the hole 6 to place the annular collar 3 contiguous with the upper surface of case cover layer 4. Inasmuch as these contiguous materials are both formed of high melt point materials, e.g., stainless steel or titanium, they can be welded together using a high temperature process to form a hermetic seal. This high temperature is in excess of the melting point of the low melt point case material, e.g., aluminum. In accordance with the invention, the case cover lower layer 5 is formed of a low melt point material, e.g., aluminum, that can then be welded to the aluminum case body material 7 using a lower temperature to form a hermetic seal.

Figure 2:
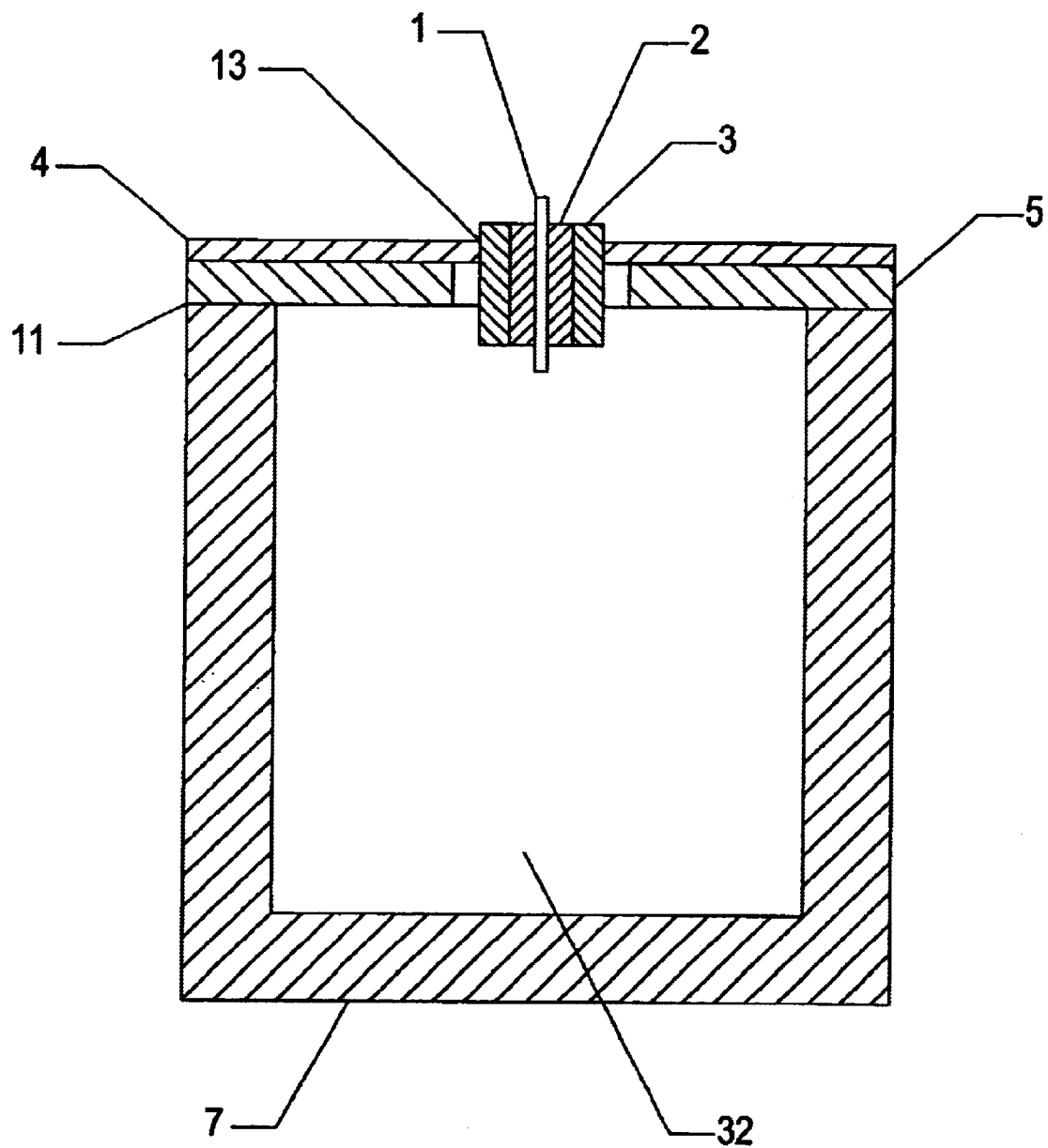
FIG. 2 is a sectional view similar to FIG. 1 but showing the feedthrough subassembly, case, and case cover assembled together.

If the clad metal were not used, the high temperature required to hermetically bond the feedthrough pin subassembly to the case would require use of a high melt point case cover. However, in trying to bond the high melt point cover to the aluminum case, the welding or brazing temperature would melt the aluminum. Exemplary melting point temperatures of the various metals are aluminum 660.37° C., stainless steel-303, 1427° C., and titanium 1660° C. In FIG. 2, low temperature hermetic welding produces a low temperature weld shown at 11. High temperature welding produces a high temperature weld shown at 13.

Figure 3A:
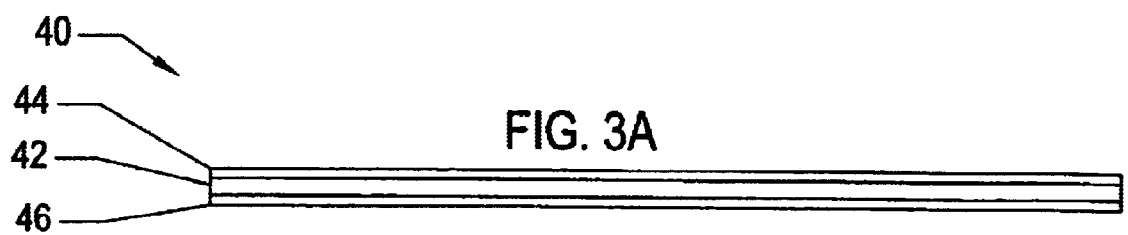
FIGS. 3A–C show the steps for making a case cover and sealing a battery case in accordance with one embodiment of the invention.
Figure 3B:
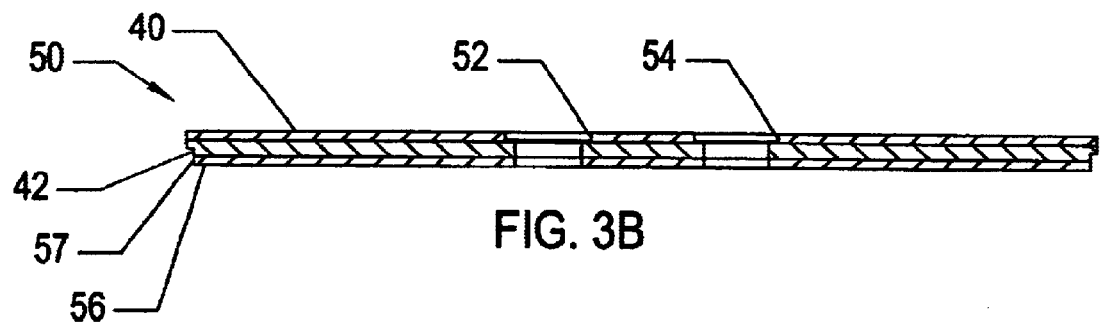
Figure 3C:
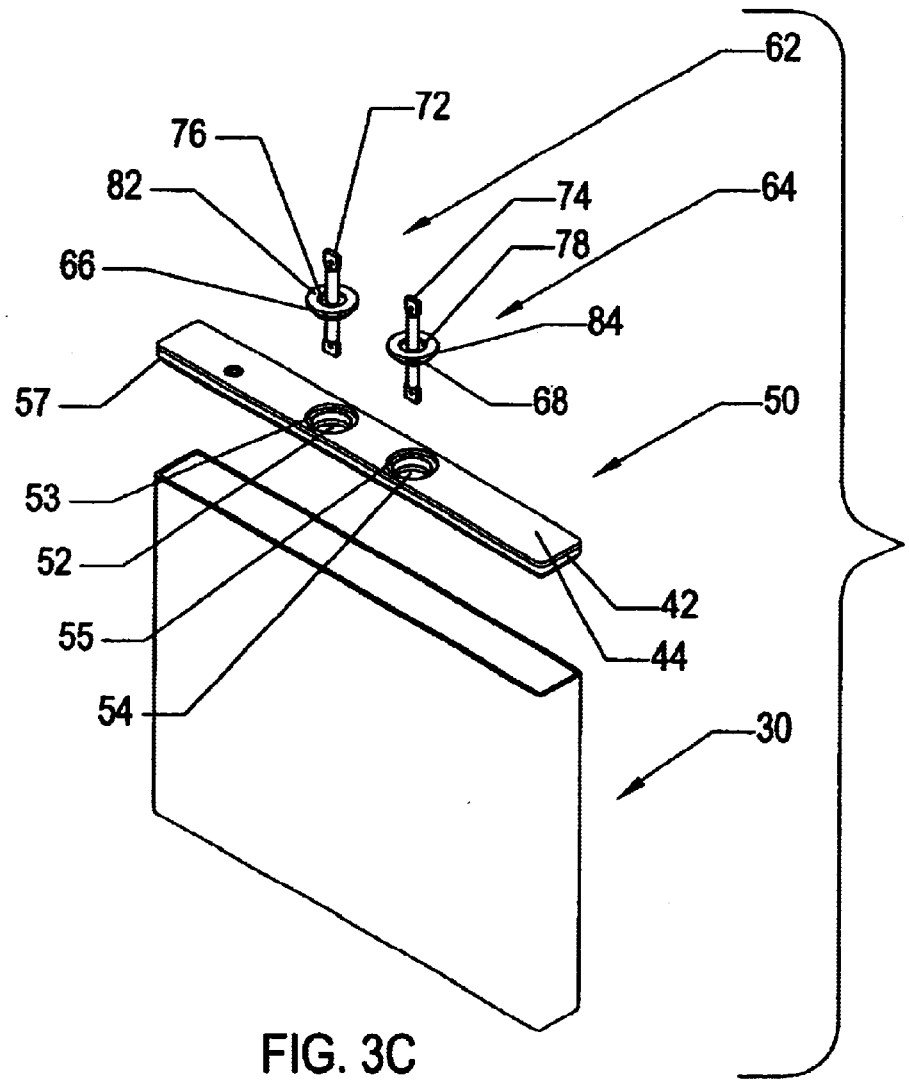

FIGS. 3A–3C show the steps for making a three-layer case cover and sealing a battery case. FIG. 3A shows a clad sheet 40 comprising a low melting point strip 42 having a top layer 44 and a bottom layer 46 of high melting point material. The sheet is preferably no more than 3 mm (0.12 inches) thick, and more preferably no more than 2 mm (0.08 inches) thick. The low melting point strip 42 preferably comprises aluminum and is preferably 0.5 to 2 mm (0.02 to 0.08 inches), and more preferably about 0.89 mm (0.035 inches) thick. The top and bottom layers of high melting point material preferably comprise stainless steel, titanium, or a titanium alloy, or a combination thereof. As used herein, "titanium" generally refers to titanium or an alloy thereof. Each layer is preferably 0.25 to 0.76 mm (0.01 to 0.03 inches), and more preferably about 0.5 mm (0.02 inches) thick. Using stainless, titanium, or titanium alloy on both faces of an aluminum sheet helps keep the clad material flat both during the cladding process and during welding. FIG. 3B is a cross sectional view of the clad case cover 50 comprising clad sheet 40 having two feedthrough holes 52, 54 and having the bottom edge 56 machined away to expose the material of the low melting point strip 42 for contacting the case and welding to it. The feedthrough holes are preferably stepped for ease of assembly. FIG. 3C is an exploded view of feedthrough subassemblies 62 and 64, a clad case cover 50, and a battery case body 30. As shown in FIG. 3C, a shoulder 66, 68 of each feedthrough assembly 62, 64 is conveniently supported by the step 53, 55 of each hole 52, 54, during welding of the feedthrough to the top layer 44 of high melting point material of the cover 50. The feedthrough subassemblies 62, 64 preferably comprise feedthrough pins 72, 74 made of PtIr or Ti-6Al-4V hermetically sealed in cylinders 76, 78 of ceramic such as CaBAl 12 glass, which are preferably hermetically sealed within annular rings 82, 84 of high melting point material. The high melting point material of the annular rings 82, 84 is welded to the high melting point material of the cover 50. The low melting point strip 42 is welded, preferably laser welded, to the battery case body 30, which comprises a low melting point material. Bottom edge 56 is machined such that top of case body 30 occupies the space of the material that was machined away, such that the outer lower edge of cover 50 is flush with the outer edge of case body 30, and the laser is directed at the junction of the cover at strip 42 and the case body 30. This configuration ensures that the metal at surface 57 of strip 42 or 46 will absorb any energy not going into forming the weld, preventing burning through to inner components such as the separator of the battery electrode assembly. The embodiment of FIGS. 3A–3C is advantageous for those applications in which high energy density is important, since the configuration is very space efficient.

Figure 4A:
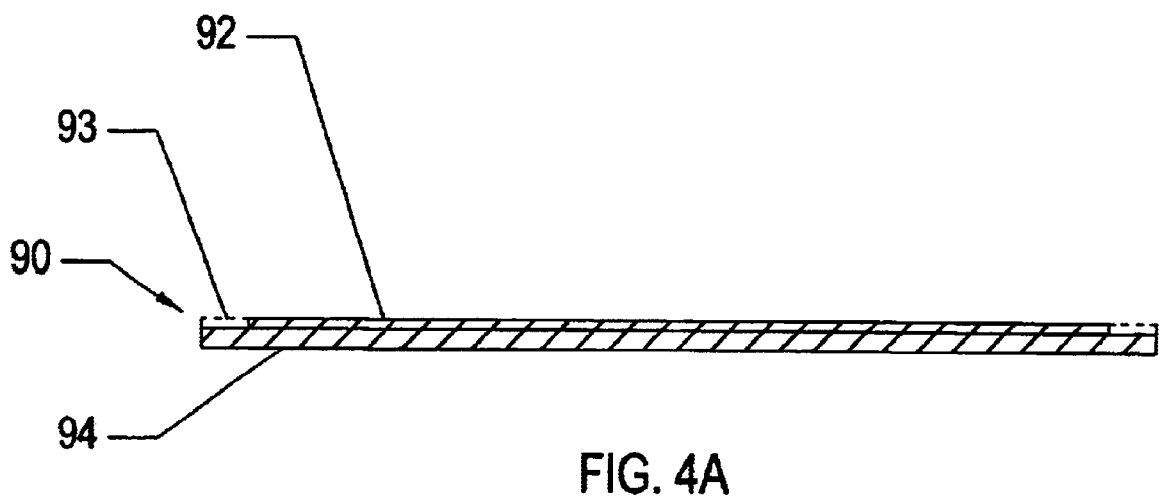
FIGS. 4A and 4B are sectional views of an alternative embodiment of the present invention.
Figure 4B:
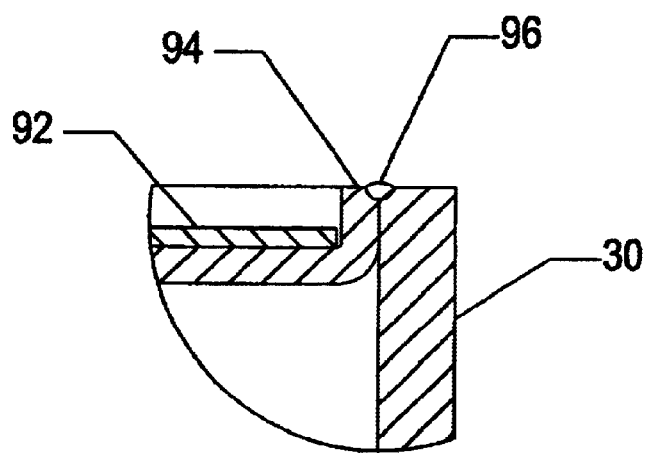

FIGS. 4A and 4B are sectional views of an alternative embodiment of the present invention. Cover 90 comprises a layer of high melting point material 92 clad to a layer of low melting point material 94. The top layer of material at the edge 93 may optionally be machined away so that the high temperature material 92 does not act as a heat sink or otherwise affect the subsequent welding of the low melt temperature layer 94. Then, the cover 90 may be stamped, punched, or otherwise formed as in FIG. 4B so that the perimeter of the cover is bent 90° from the main body of the cover. This allows the low melting point material 94 to be joined to the high melting point case body 30 with a "top down" weld 96. Welding from the top of the case on the single planar surface formed by aligning the edge of low melting point material 94 with the top edge of battery case body 30 is easier and therefore can be less costly than welding from the side. Weld 96 is preferably a laser weld.

Figure 5A:
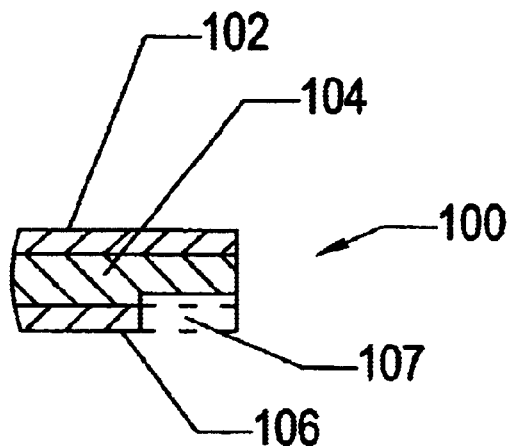
FIGS. 5A and 5B are sectional views of an alternative embodiment of the present invention.
Figure 5B:
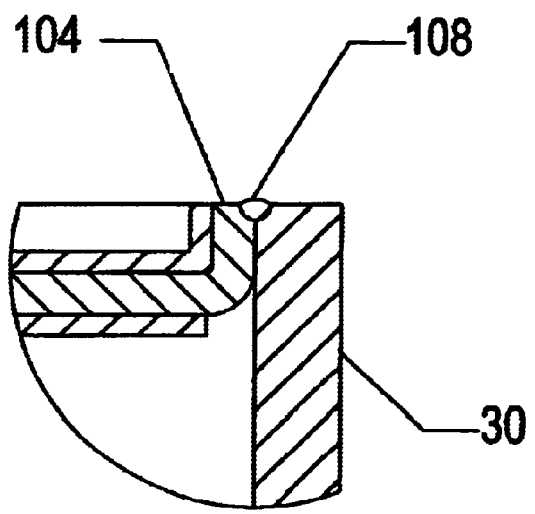

FIGS. 5A and 5B are sectional views of an alternative embodiment of the present invention. Cover 100 comprises a top layer of high melting point material 102 and a bottom layer of high melting point material 106 clad to a layer of low melting point material 104. Material at the edge 107 may be machined away to expose the low melt temperature layer 104. Then, the cover 100 may be stamped, punched, or otherwise formed as in FIG. 5B so that the low melting point material 104 can be joined to the low melting point case body 30 with a "top down" weld 108. Weld 108 is preferably a laser weld.

Figure 6:
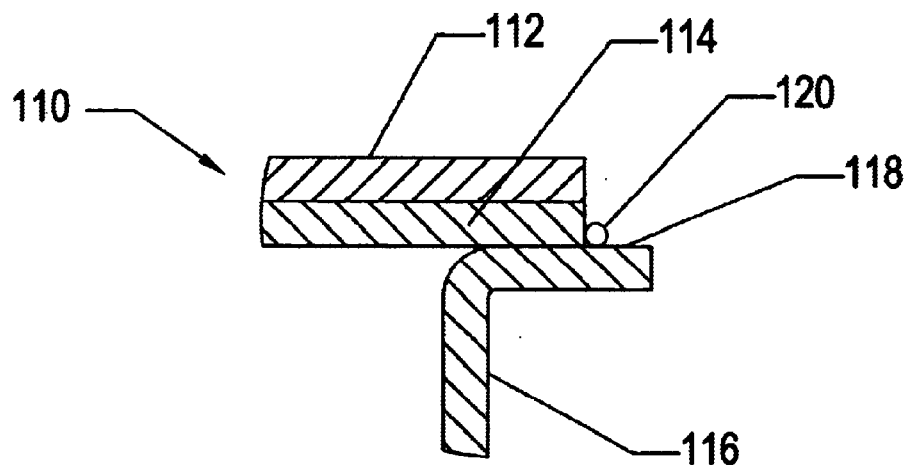
FIG. 6 is a sectional view of an alternative embodiment of the present invention.

FIG. 6 is a sectional view of an alternative embodiment of the present invention. Cover 110 comprises a layer of high melting point material 112 clad to a layer of low melting point material 114. Although not shown but similar to the embodiment shown in FIG. 4A, the top layer of material at the edge may be machined away so that the high temperature material 112 does not act as a heat sink or otherwise affect the subsequent welding of the low melt temperature layer 114. In this case, the cover 110 need not be formed and may remain flat. Case 116 may be stamped, drawn, or otherwise formed to create a ledge 118 so that the low melting point material 114 can be joined to the low melting point case 116 with a tungsten inert gas (TIG) weld, with the weld bead shown at 120. Again, this weld can be made "top down" and/or on a single planar surface, in this case, the ledge 118 of case 116, improving manufacturability.

Figure 7:
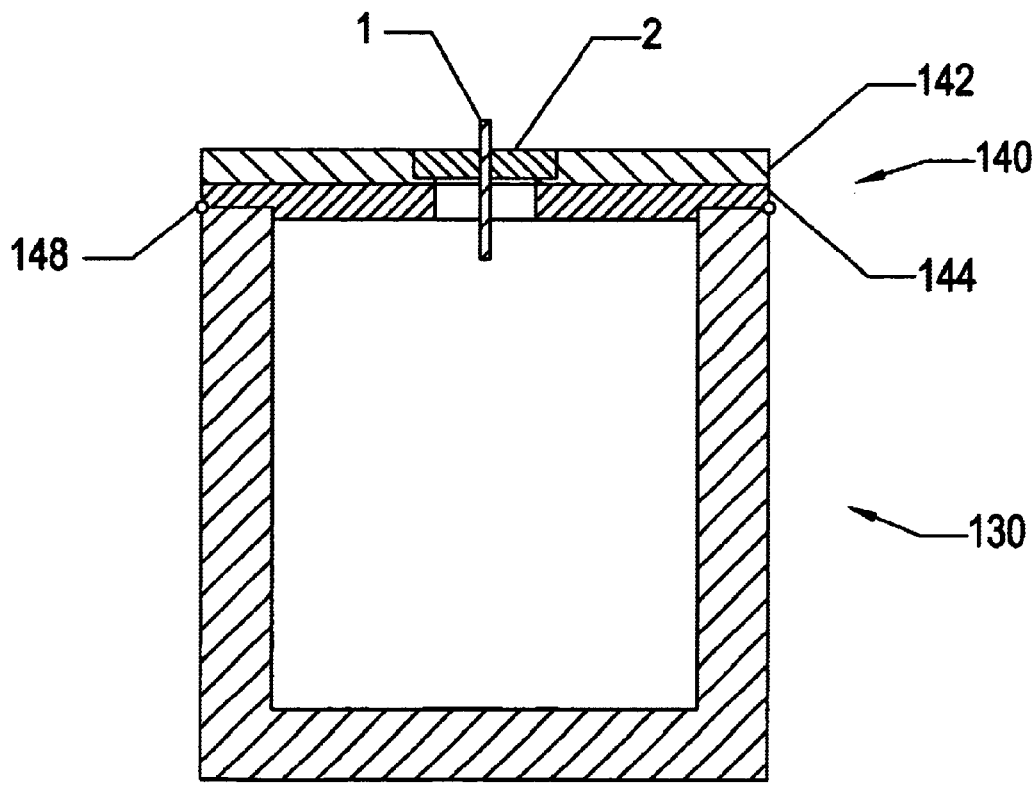
FIG. 7 is a sectional view of another alternative embodiment of the present invention.

FIG. 7 is a sectional view showing an assembled battery case body, cover, and feedthrough of another alternative embodiment of the present invention. In this embodiment, the case body 130, clad cover 140, and feedthrough pin 1 are made of metals that can withstand the temperatures required for hermetically sealing the ceramic cylinder 2 directly to the cover. The ceramic cylinder 2 is preferably a glass, such as CaBAl 12, which can be baked into the cover directly without requiring an annular metal collar. The cover comprises a first material 142 that has a coefficient of thermal expansion (CTE) suitably matched to the pin 1 and ceramic cylinder 2 for installing the feedthrough subassembly directly into the cover using a compression seal, and a second material 144 that is matched to the case body for forming a reliable hermetic weld 148, which is preferably a laser weld. Both materials 142 and 144 have sufficiently high melting points to withstand the baking-in process of the feedthrough directly to the cover 140. When using a glass and forming a compression seal, the materials 142 and 144 preferably have melting points that can withstand temperatures needed to flow the glass. Preferred materials for this embodiment include a first material 142 of stainless steel, and a second material 144 and a case body 130 of titanium or an alloy thereof. This configuration and material combination facilitates manufacturing of a battery having a strong yet lightweight battery case.

Titanium to stainless steel cladding can be made using any method known in the art that will produce a clad material capable of withstanding processing at the temperature necessary to seal ceramic cylinder 2 to cover 140. Examples can be found in WO 00/24542 entitled "Method of producing metal composites which can be processed at high temperatures," which describes a cladding method that uses one or more interlayers of high melting point material between the titanium and stainless steel layers, and Japanese Patent Laid Open Application, Publication No. 06-234083 entitled "Titanium clad stainless steel plate and its production," which describes a cladding method in which titanium material is directly clad to stainless steel.

The clad material used in FIG. 7 may comprise two layers, as shown therein, or may comprise three layers, as shown in FIG. 3A–C. In the three-layer version, the clad sheeting may comprise a titanium sheet having stainless steel clad onto both faces thereof, or a stainless steel sheet having titanium clad onto both faces thereof. For a titanium case body, where stainless steel is on the bottom layer of the cover, the edge of it is machined away to expose the titanium for welding to the case body, in a similar manner as shown in FIG. 3A–C. Likewise, in a cover comprising only one layer of titanium and one layer of stainless steel, either one may be comprise the bottom layer of the cover; if the stainless steel layer is on the bottom, the edge of it is machined away to expose the titanium for welding to a titanium case body. As shown in FIG. 7, even if the titanium is on the bottom layer 144 of cover 140, a step may be machined into it without breaking through to the stainless steel for seating the case body and to prevent burning through to inner battery components such as the separator during welding, as described with respect to FIG. 3A–C.

For compression sealing glass as the ceramic cylinder 2, the through hole in the clad sheet is preferably stepped, with the glass aligned with the cladding layer that has a CTE matched to that of the glass. Therefore, although FIG. 7 shows the ceramic cylinder 2 sealing with the top layer of the clad sheeting, if the bottom layer is the layer matching the CTE of the glass, the glass may be aligned with and form a seal with the bottom layer. Furthermore, for the three-layer clad material, a layer that has a CTE matched to that of the glass is aligned with the glass and sealed thereto; this may be the top, middle, or bottom layer.

Any of the configurations shown in FIGS. 1–6 may utilize a titanium case body, a stainless steel feedthrough collar, and a clad cover of titanium and stainless steel. In that case, the stainless steel annular collar is preferably welded to a stainless steel layer of the cover, and a titanium layer of the cover is welded to the titanium case body. Other material combinations are within the scope of the invention.

While the invention herein disclosed has been described by means of specific embodiments and applications thereof, numerous modifications and variations could be made thereto by those skilled in the art without departing from the scope of the invention set forth in the claims.

What is claimed is:

1. A sealed battery case comprising:
a battery case body comprising a first metal;
a cover comprising a hermetically clad sheet comprising a second metal and a third metal, said clad sheet having a hole therethrough;
a feedthrough comprising:
a ceramic cylinder; and
a conductive pin through said ceramic cylinder and hermetically sealed thereto; wherein
said feedthrough does not have an annular metal collar surrounding said ceramic cylinder; wherein
said first metal is hermetically sealed to said second metal; wherein
said feedthrough is hermetically sealed to said cover; and wherein
said third metal is not directly weldable to said first metal.

2. A sealed battery case as in claim 1 wherein said ceramic comprises a glass, and wherein said second metal has a coefficient of thermal expansion (CTE) suitable for compression sealing said conductive pin and said third metal to said glass.

3. A sealed battery case as in claim 1 wherein said hole through the clad sheet is a stepped hole.

4. A sealed battery case as in claim 1 wherein said clad sheet comprises a configuration chosen from the group consisting of: said second metal having said third metal clad onto both faces thereof and said third metal having said second metal clad onto both faces thereof.

5. A sealed battery case as in claim 1 wherein said second metal and said first metal have substantially the same melting point.

6. A sealed battery case as in claim 1 wherein said second and third metals have a melting point >800° C.

7. A sealed battery case as in claim 1 wherein said first metal is hermetically attached to said second metal with a laser weld.

8. A sealed battery case as in claim 1 wherein:
said first and second metals comprise titanium; and
said third metal comprises stainless steel.

9. A sealed battery case comprising:
a battery case body comprising a first metals comprising titanium;
a cover comprising a hermetically clad sheet comprising a second metal comprising titanium and a third metal comprising stainless steel, said clad sheet having a hole therethrough;
a feedthrough comprising:
a ceramic cylinder; and
a conductive pin through said ceramic cylinder and hermetically sealed thereto; wherein
said first metal is hermetically attached to said second metal; and wherein
said feedthrough is hermetically sealed to said third metal of said cover.

10. A sealed battery case as in claim 9 wherein said hole through the clad sheet is a stepped hole.

11. A sealed battery case as in claim 9 wherein said clad sheet comprises a configuration chosen from the group consisting of: said second metal having said third metal clad onto both faces thereof and said third metal having said second metal clad onto both faces thereof.

12. A sealed battery case as in claim 9 wherein said ceramic comprises a glass, and wherein said stainless steel has a coefficient of thermal expansion (CTE) suitable for compression sealing said conductive pin and said stainless steel to said glass.

13. A sealed battery case as in claim 9 wherein said first metal is hermetically attached to said second metal with a laser weld.

14. A sealed battery case as in claim 9 wherein said feedthrough does not have an annular metal collar surrounding said ceramic cylinder.

15. A sealed battery case as in claim 9 wherein said feedthrough further comprises an annular collar surrounding said ceramic cylinder and made from a fourth metal wherein said fourth metal is directly weldable to said third metal of said cover.

16. A sealed battery case as in claim 15 wherein said first metal is hermetically attached to said second metal via a first weld and wherein said third metal is hermetically attached to said fourth metal via a second weld, wherein said first weld is a higher temperature weld than said second weld.

17. A sealed battery case comprising:
a battery case body comprising a first metal, said battery case body having an upper surface having an outer edge;
a cover having an outer, lower edge and comprising a sheet of a second metal hermetically clad with a third metal, said clad sheet having hole therethrough;
a feedthrough comprising:
a ceramic cylinder; and
a conductive pin through said ceramic cylinder and hermetically sealed thereto; and
said first metal is hermetically attached to said second metal such that said outer, lower edge of said cover is substantially flush with said outer edge of the upper surface of the battery case body; wherein
said feedthrough is hermetically sealed to said cover; and wherein
said third metal is not directly weldable to said first metal.

18. A sealed battery case as in claim 17 wherein said hole through the clad sheet is a stepped hole.

19. A sealed battery case as in claim 17 wherein said cover comprises metal cladding onto both faces of said sheet.

20. A sealed battery case as in claim 17 wherein said second metal and said first metal have substantially the same melting point.

21. A sealed battery case as in claim 17 wherein:
said first and second metals comprise titanium; and
said third metal comprises stainless steel.

22. A sealed battery case as in claim 17 wherein said first metal is hermetically attached to said second metal with a laser weld.

23. A sealed battery case as in claim 17 wherein said feedthrough further comprises:
an annular collar comprising a fourth metal, surrounding said ceramic cylinder and hermetically sealed thereto; wherein
said fourth metal of said feedthrough is hermetically joined to said third metal.

24. A sealed battery case as in claim 23 wherein said fourth and said third metal have substantially the same melting point.

25. A sealed battery case as in claim 23 wherein said fourth metal is hermetically joined to said third metal via a first weld and wherein said first metal is hermetically attached to said second metal via a second weld, wherein said first weld and said second weld are different temperature welds.

26. A sealed battery case as in claim 23 wherein:
said first and second metals comprise aluminum; and
said third and fourth metals comprise titanium.

27. A sealed battery case as in claim 23 wherein:
said first and second metals comprise aluminum; and
said third and fourth metals comprise stainless steel.

28. A sealed battery case as in claim 23 wherein:
said first and second metals comprise titanium; and
said third and fourth metals comprise stainless steel.

29. A sealed battery case comprising:
a battery case body comprising a first metal;
a cover comprising a sheet of a second metal hermetically clad with a third metal made by the steps of:
bonding said third metal to said second metal using pressure and heat; and
preparing a stepped hole through said clad sheet;
a feedthrough comprising:
a ceramic cylinder;
a pin through said ceramic cylinder; and
said pin hermetically sealed to said ceramic cylinder; and
said first metal hermetically welded to said second metal; wherein
said third metal is not directly weldable to said first metal; and wherein
said feedthrough is hermetically sealed to said cover.

30. A sealed battery case as in claim 29 wherein said bonding step comprises:

feeding sheet metal cladding onto at least one face of a strip to form an assembly; and passing the assembly to a hot roll bonding system for cladding.

31. The sealed battery case as in claim 29 wherein said feeding step comprises feeding sheet metal cladding onto both faces of said strip.

32. A sealed battery case as in claim 29 wherein said first metal is hermetically laser welded to said second metal.

33. The sealed battery case as in claim 29 wherein said feedthrough further comprises:

an annular collar comprising a fourth metal, surrounding said ceramic cylinder and hermetically sealed thereto; wherein said fourth metal of said feedthrough is hermetically joined to said third metal.

34. A sealed battery case as in claim 33 wherein:

the first and second metals comprise aluminum; and the third and fourth metals comprise titanium.

35. A sealed battery case as in claim 33 wherein:

the first and second metals comprise aluminum; and the third and fourth metals comprise stainless steel.

36. A sealed battery case as in claim 33 wherein:

said first and second metals comprise titanium; and said third and fourth metals comprise stainless steel.

37. A sealed battery case as in claim 33 wherein:

said first and second metals comprise stainless steel; and said third and fourth metals comprise titanium.

38. A sealed battery case an in claim 33 wherein said second metal and said first metal have substantially the same melting point, and wherein said fourth metal and said third metal have substantially the same melting point.

39. A sealed battery case as in claim 33 wherein said fourth metal is hermetically welded to said third metal via a high temperature weld and wherein said first metal is hermetically welded to said second metal via a low temperature weld.

40. A sealed battery case comprising:

a battery case body comprising a first metal;

a cover comprising a sheet of a second metal hermetically clad with a third melting point metal, the clad sheet having a hole therethrough;

a feedthrough comprising:

a ceramic cylinder; and a conductive pin through said ceramic cylinder and hermetically sealed thereto; wherein an annular cylinder comprising a fourth metal, surrounding said ceramic cylinder and hermetically sealed thereto; wherein said third metal is hermetically joined to said fourth metal of said cover via a first weld; and said first metal is hermetically attached to said second metal via a second weld; wherein said first and second welds are different temperature welds.

41. A sealed battery case as in claim 40 wherein:

said first and second metals comprise aluminum; and said third and fourth metals comprise titanium.

42. A sealed battery case as in claim 40 wherein:

said first and second metals comprise aluminum; and said third and fourth metals comprise stainless steel.

43. A sealed battery case as in claim 40 wherein:

said first and second metals comprise titanium; and said third and fourth metals comprise stainless steel.

44. A sealed battery case an in claim 40 wherein said second metal and said first metal have substantially the same melting point, and wherein said fourth metal and said third metal have substantially the same melting point.

45. A sealed battery case as in claim 40 wherein said first and second welds are laser welds.

46. A sealed battery case comprising:

a battery case body comprising a first metal;

a cover comprising a sheet of a second metal hermetically clad with a third metal and having at least one hole therethrough;

at least one feedthrough comprising:

a ceramic cylinder;

a pin through said ceramic cylinder; and said pin hermetically sealed to said ceramic cylinder; and said first metal hermetically welded with a top down weld to said second metal; wherein said feedthrough is hermetically sealed to said cover; and wherein said third metal is not directly weldable to said first metal.

47. A sealed battery case as in claim 46 wherein said bonding step comprises:

feeding sheet metal cladding onto at least one face of a strip to form an assembly; and;

passing the assembly to a hot roll bonding system for cladding.

48. The sealed battery case as in claim 46 wherein said feeding step comprises feeding sheet metal cladding onto both faces of said strip.

49. A sealed battery case as in claim 46 wherein:

the first and second metals comprise aluminum; and the third and fourth metals comprise titanium.

50. A sealed battery case as in claim 46 wherein:

the first and second metals comprise aluminum; and the third and fourth metals comprise stainless steel.

51. A sealed battery case as in claim 46 wherein:

the first and second metals comprise titanium; and the third and fourth metals comprise stainless steel.

52. A sealed battery case an in claim 46 wherein said second metal and said first metal have substantially the same melting point, and wherein said fourth metal and said third metal have substantially the same melting point.

53. A sealed battery case as in claim 46 wherein said fourth metal is hermetically welded to said third metal via a first weld and wherein said first metal is hermetically welded to said second metal via a second weld, wherein said first and second welds are different temperature welds.

54. A sealed battery case as in claim 46 wherein said first metal is hermetically welded to said second metal via a laser weld.

55. A sealed battery case as in claim 46 wherein said first metal is hermetically welded to said second metal via a TIG weld.

* * * * *